June 9, 1931.                D. ELDER                1,809,440
FLUSH VALVE
Filed Jan. 27, 1930    2 Sheets-Sheet 1
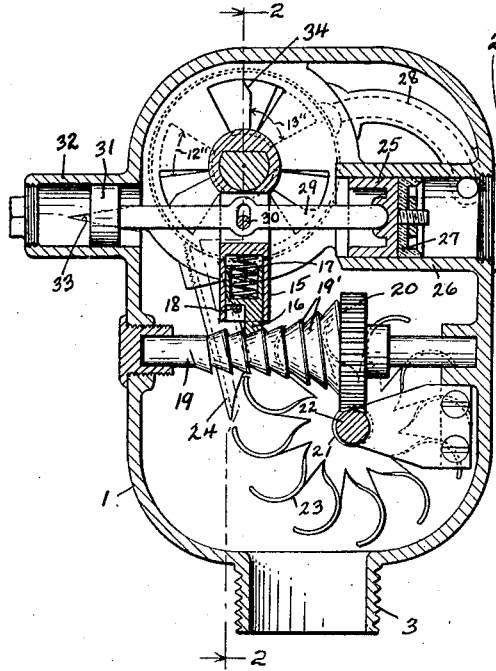
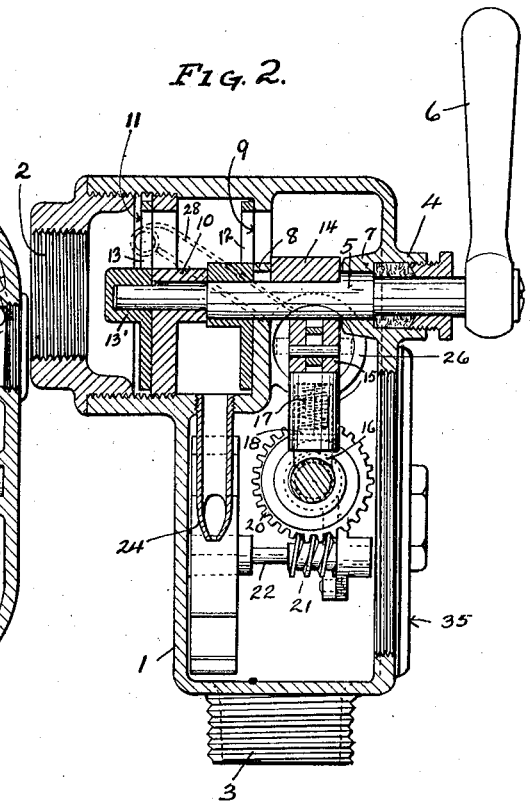
INVENTOR.
DONALD ELDER
BY *Miller Boykin & Bried*
ATTORNEYS.

June 9, 1931.    D. ELDER    1,809,440

FLUSH VALVE

Filed Jan. 27, 1930    2 Sheets-Sheet 2

INVENTOR.
DONALD ELDER
BY
ATTORNEYS.

Patented June 9, 1931

1,809,440

UNITED STATES PATENT OFFICE

DONALD ELDER, OF BERKELEY, CALIFORNIA

FLUSH VALVE

Application filed January 27, 1930. Serial No. 423,859.

This invention relates to flush valves as used for flushing toilets or controlling the time of flow of water to any apparatus requiring an automatic turning off of the water after a predetermined length of time.

The objects of the invention are to provide improvements in a valve of this type whereby all time control through pistons and small orifices is avoided, the mechanism is simple and will operate with a rotary type of valve, and a construction which will entirely avoid water hammer.

Briefly described my improved flush valve comprises a chambered body with a water passage therethrough closed by a valve which is opened by a hand lever, and closed through rotation of a turbine in the discharge water stream and finally completed by a small plunger operated by the service pressure.

Two forms of my valve construction are shown in the drawings.

Fig. 1 is a front view in section showing my valve in its preferred form.

Fig. 2 is a side vertical section of the valve of Fig. 1 as seen from the line 2—2 thereof.

Figure 4:
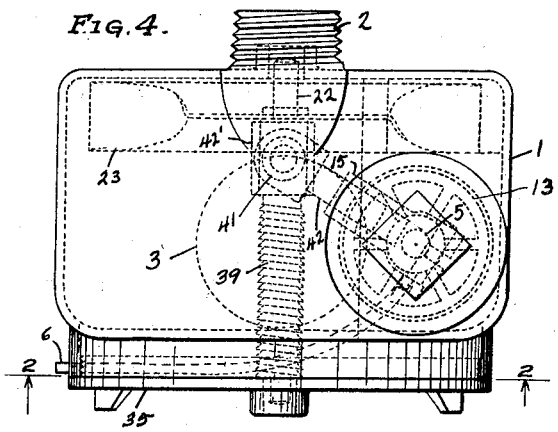
Fig. 4 is a plan view of the device of Fig. 3 with side cap in place.
Figure 6:
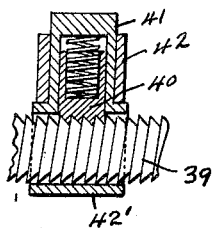
Fig. 6 is an enlarged section of ratchet pawl.
Figure 3:
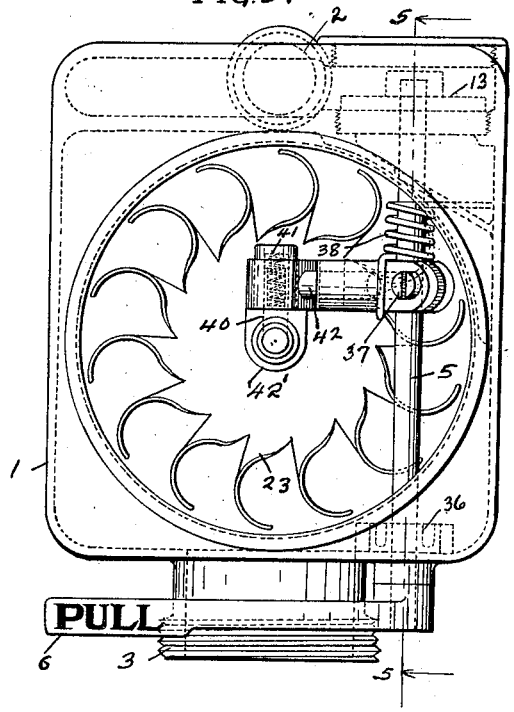
Fig. 3 is a side view of a modified form of my valve with side cap removed showing turbine and threaded timing mechanism.

The device will first be described with reference to Figs. 1 and 2 and wherein the body 1 is a hollow chamber provided with a threaded inlet pipe connection 2 and a threaded outlet pipe connection 3 positioned at right angles to the inlet.

In line with the inlet is a stuffing box 4 through which projects a valve stem 5 rotatable by means of a handle 6.

Stem 5 passes through two fixed bearings 7 and 8, the latter also forming a secondary valve seat 9 and through a bearing 10 in the hub of a removable valve seat 11 screwed into the body from the opening into which the inlet connection 2 is screwed in place.

Valve stem 5 also passes through a rotary valve disk 12 and into the hub of a rotary valve disk 13 and is flattened on one side complementarily to the hole in the hubs of the valves so as to turn same simultaneously, and the stem is also flattened where it passes through a hub 14 of an arm 15 carrying at its outer end a ratchet pawl 16 resiliently pushed outward by means of a small spring 17 to abutting position with a stop pin 18.

Rotatably extending across the chamber and engaged by the ratchet pawl 16 is a specially threaded screw rod 19 carrying a worm gear 20 engaged by a worm 21 mounted on a small shaft 22 extending at right angles to screw rod 19 and upon which shaft is mounted a tangential type turbine wheel 23 positioned close to one side of the housing in a manner so that water passing over it from the valved passage will discharge through outlet 3, but the turning effect is augmented by means of a nozzle 24 leading from the space between valves 12 and 13 to a point adjacent the wheel.

The special thread 19′ on rod 19 is curved generally from the center of valve stem 5 and so formed with a straight wall that when the arm 15 is swung the pawl 16 will always engage the straight wall against return of the arm. Thus if the valve is manually opened by turning the handle 6 the ratchet pawl will be flipped along the special thread and engage it so that the valve cannot close except as the revolving turbine slowly screws the pawl along the thread.

However, as the force of the water is falling off quickly toward the point of closure of the valve some other means must be used to completely close the valve and this is provided in a small piston or plunger 25 working in a cylinder 26 and which piston is fitted with a cup leather 27 and is always forced outwardly by means of water under pressure through channel 28 led from a point on the inlet water passage above the outer or main valve 13.

Piston 25 communicates its motion to the stem 5 by means of a rod 29 which rests at its end within the piston, passes through a slot in arm 15 and is connected to the arm by means of a pin 30 working in a slot in the rod, while the opposite end of the rod is connected to a small plunger 31 operating in a dash pot 32 provided with a relief port 33 in its side or equivalent vent so that the initial movement of the plunger 31 will be quite free but the resistance will build up quickly toward the end of the stroke in expelling any water entrapped in the dash pot.

Valves 12 and 13 are both of the rotary disk type with three segmental openings seated on flat valve seats similarly formed, and both are fairly loose on the valve stem so that they can freely adjust themselves for a perfect seat though they are both held fairly close to their seats by the surrounding construction so as not to require holding down springs where the water pressure is reasonably steady.

Outer valve 13 is the main valve and its hub 13′ is continuous over the outer end of stem 5 so as to avoid leakage at this point, and the openings 13″ in this valve are a trifle larger than the openings 12″ in valve 12 so that valve 12 will close first. Besides this, it is desirable that the opening in valve 13 be notched as at 34 so that a small feed of water will be maintained to the turbine through nozzle 24 even after valve 12 is closed and until the pawl 16 has worked off of the last thread onto the smooth shank 19 so that plunger 25 can complete the closing action by shoving against the arm.

In Fig. 1 the pawl arm is shown in intermediate position of its movement with valves about half open. The proportions of the parts are such that the arm 15 strikes at opposite ends of its travel at full open and completely closed position of the valves.

For ease of assembling of the parts screw plugs are provided where indicated and a large screw cap 35 is provided at the side of the body through which the turbine and other mechanism may be inserted and adjusted to position.

From the foregoing description the action will be readily understood, but it should be noted that the parts are so proportioned that a fractional turn of the handle moves the pawl as far as it will go (to the open position of the valves), also forces the water from under small piston 25 and whereupon the revolving of the thread or worm 19′ aided by the slight push of the piston turns the valve stem toward closed position.

When the outer valve is almost closed the pressure under piston 25 builds up so that it gently but firmly completes the closing.

Dash pot 32 is seldom required, but sometimes is valuable where the water pressure is extra high.

The final stream running from nozzle 24 after closing of valve 12 is so regulated by the proportions of the parts so as to fill the bowl after siphoning action.

In the construction shown in Figs. 3 to 6 the operation is subtantially the same except that the hydraulic plunger is omitted, as is also the inner of the two valves and the countershaft or rod 19 carrying the special thread and the thread is formed directly on the turbine shaft.

This valve closes with a spring action and hence is not as quiet as the hydraulic closed valve of Figs. 1 and 2.

In the design of Figs. 3 to 6 the parts which are identical in description and operation are similarly numbered so as to considerably shorten this description while preserving the identity of the construction.

The rotatable valve stem 5 is here kept tight by a simple cup leather 36 instead of a stuffing box and the pawl arm 15 is clamped to the stem by means of a screw 37 and is resiliently pulled, by a coiled spring 38 mounted on the stem, in a direction tending to close the valve 13.

The special thread here numbered 39 is not curved as in the first design but is of constant diameter either cut or mounted directly on the turbine shaft 22 is engaged by a special pawl 40 slidably mounted in a small hub 41 revolvably carried at the outer end of a short rod 42 slidably mounted in arm 15 so that in swinging the arm by manual opening of the valve the rod can slide in or out to compensate for the position of the threads engaged by the pawl, hub 41 being provided with a collar 42′ loosely embracing the outer diameter of the thread to guide the pawl along the same.

In this showing the plan Fig. 4 shows the valve closed and pawl arm angularly extended as at the closed position of the valve, and at which position the pawl has ridden up out of the teeth of the thread so as to free the valve stem for final closing movement under influence of the spring 38.

Figure 5:
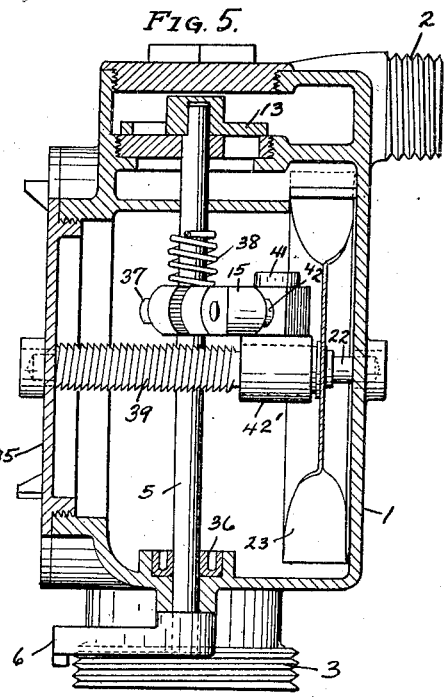
Fig. 5 is a side view of Fig. 3 taken through the line 5—5.

In Fig. 5 it will be seen that the removable side cap 35 of the chamber 1 also carries a bearing for the threaded rod 39.

One of the most important features of the invention is the combination whereby a rotary disk valve is turned by water operated mechanism positioned within the body of the device for this makes is possible to get a full opening with a small movement and to close gently without causing water hammer, and I believe I am first to effect this combination.

It is of course evident without further drawings, that the various good features of the two designs may be combined to any extent desired without changing the mode of operation and any such combination or changes in detail falling within the scope of the invention are intended to be covered in the appended claims.

I claim:

1. A water flow controlling device comprising a chambered body with an inlet and an outlet passage for water to flow therethrough, a rotary valve across the inlet passage, means accessible at the exterior of said body for manually rotating said valve to open the same, means tending to close said valve including a piston under pressure of water from a point ahead of said valve, and means within said body operated by flow of water therethrough controlling the time of closing.

2. A water flow controlling device comprising a chambered body with an inlet and an outlet passage for water to flow therethrough, a rotary valve across the inlet passage, means accessible at the exterior of said body for manually rotating said valve to open the same, a piston under pressure of water from a point ahead of said valve tending to close the valve, and means within said body operated by flow of water therethrough controlling the time of closing.

3. A water flow controlling device comprising a chambered body with an inlet and an outlet passage for water to flow therethrough, a valve across the inlet passage, means accessible at the exterior of said body for manually operating said valve to open the same, means tending to close said valve including a piston under pressure of water from a point ahead of said valve, and means within said body operated by flow of water therethrough controlling the time of closing.

4. A water flow controlling device comprising a chambered body with an inlet and an outlet passage for water to flow therethrough, a valve across the inlet passage, means accessible at the exterior of said body for manually operating said valve to open the same, a piston under pressure of water from a point ahead of said valve tending to close the valve, and means within said body operated by flow of water therethrough controlling the time of closing.

5. A water flow controlling device comprising a chambered body with an inlet and outlet passage for water to flow therethrough, inner and outer spaced rotary disk valves across the inlet passage, means accessible at the exterior of said body for manually rotating said valves to open the same, means tending to close said valves, and means within said body operated by flow of water controlling the time of closing, said valves being set to close the inner valve first.

6. A water flow controlling device comprising a chambered body with an inlet and an outlet passage for water to flow therethrough, inner and outer spaced rotary disk valves across the inlet passage, means accessible at the exterior of said body for manually rotating said valves to open the same, means tending to close said valves, means within said body operated by flow of water controlling the time of closing, said valves being set to close the inner valve first, and a drain from the space between said valves to said outlet.

7. A water flow controlling device comprising a chambered body with an inlet and an outlet passage for water to flow therethrough, inner and outer spaced rotary disk valves across the inlet passage, means accessible at the exterior of said body for manually rotating said valves to open the same, means tending to close said valves, means within said body operated by flow of water controlling the time of closing, said valves being set to close the inner valve first, and a drain from the space between said valves to said outlet arranged to contribute water flow for operating the time controlling means of the valves.

8. A water flow controlling device comprising a chambered body with an inlet and an outlet passage for water to flow therethrough, a valve across the inlet passage, means accessible at the exterior of said body for manually operating said valve to open the same, means tending to close said valve, means operated by flow of water therethrough controlling the time of closing of said valve, and a dash pot within said body checking the final closing of said valve.

9. A water flow controlling device comprising a chambered body with an inlet and an outlet passage for water to flow therethrough, a valve across the inlet passage, means accessible at the exterior of said body for manually operating said valve to open the same, a piston actuated by pressure of water from a point ahead of said valve tending to close said valve, means operated by flow of water therethrough controlling the time of closing of said valve, and a dash pot within said body checking the final closing of said valve.

10. In a flushing device, a chambered body, a revolvable rod for opening the valve provided with a handle exterior to said body, a ratchet pawl carried by the arm within the chamber, a screw along which said pawl engages so as to hold said valve open, and means operated by flow of water through said device for revolving said screw and returning said pawl toward starting position.

11. In a flushing device, a chambered body, a revolvable rod for opening the valve provided with a handle exterior to said body, a ratchet pawl carried by the arm within the chamber, a screw along which said pawl engages so as to hold said valve open, a water-wheel in said chamber operated by flow of water through said device, and gearing between said water-wheel and said screw for revolving said screw and returning said pawl toward starting position.

12. In a structure as specified in claim 10, means provided to compensate for the arc of swinging of said arm and maintaining the ratchet contact with said screw.

13. In a structure as specified in claim 10, said screw being curved in a manner to compensate for the arc of swinging said arm.

14. In a structure as specified in claim 10, said screw formed to free the ratchet pawl as the valve nears its closed position.

15. In a structure as specified in claim 10, said screw formed to free the ratchet pawl as the valve nears its closed position and resilient means for effecting the final closing movement of the valve.

16. In a structure as specified in claim 10, said screw formed to free the ratchet pawl as the valve nears its closed position and resilient means for effecting the final closing movement of the valve comprising a piston actuated by water pressure from a point in advance of the valve operatively connected to said valve.

17. In a structure as specified in claim 10, said screw formed to free the ratchet pawl as the valve nears its closed position, resilient means for effecting the final closing movement of the valve comprising a piston actuated by water pressure from a point in advance of the valve operatively connected to said valve, and means for braking the final closing action of said valve.

DONALD ELDER.